Figure 1:
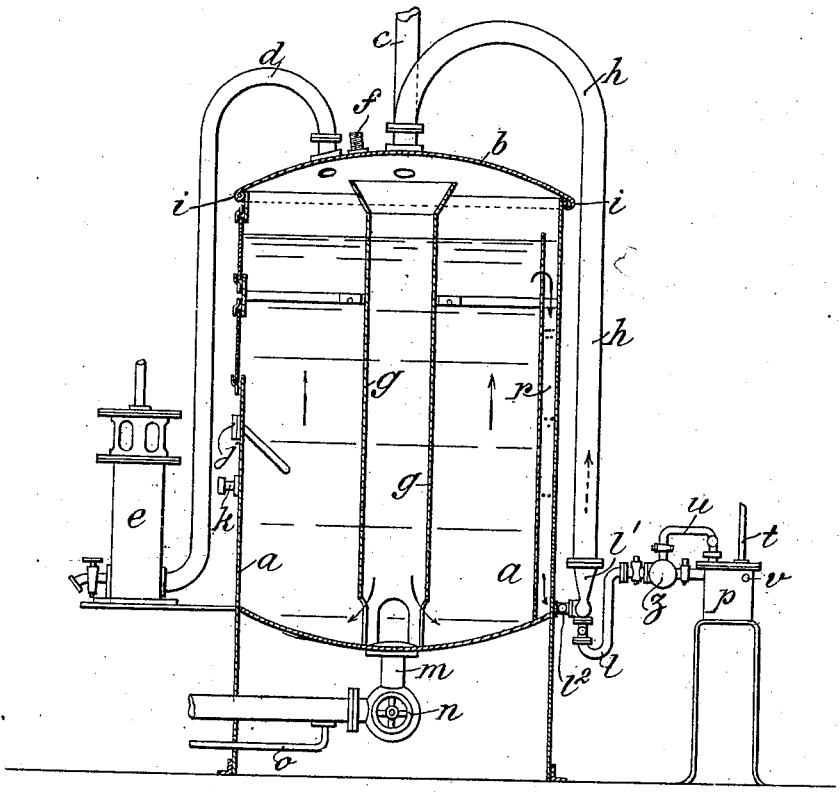

No. 687,122. Patented Nov. 19, 1901.
L. C. A. CALMETTE.
PROCESS OF MANUFACTURING GLUCOSE.
(Application filed Nov. 12, 1900.)
(No Model.) 2 Sheets—Sheet 1.

WITNESSES:
Fred White
Thomas F. Wallace

INVENTOR:
Léon Charles Albert Calmette,
By his Attorneys:
Arthur C. Fraser & Co.

No. 687,122. Patented Nov. 19, 1901.
L. C. A. CALMETTE.
PROCESS OF MANUFACTURING GLUCOSE.
(Application filed Nov. 12, 1900.)

(No Model.) 2 Sheets—Sheet 2.

WITNESSES:
Fred White
Thomas S. Wallace

INVENTOR:
Léon Charles Albert Calmette,
By his Attorneys

UNITED STATES PATENT OFFICE.

LÉON CHARLES ALBERT CALMETTE, OF LILLE, FRANCE.

PROCESS OF MANUFACTURING GLUCOSE.

SPECIFICATION forming part of Letters Patent No. 687,122, dated November 19, 1901.

Application filed November 12, 1900. Serial No. 36,153. (No specimens.)

*To all whom it may concern:*

Be it known that I, LÉON CHARLES ALBERT CALMETTE, a citizen of the Republic of France, residing in Lille, France, have invented certain new and useful Improvements in the Manufacture of Glucose, of which the following is a specification.

Hitherto it has not been possible to apply saccharifying mucedins to the manufacture of glucose, because when the mucedinized substances push to the surface of the charge and come into contact with the air without agitation they saccharify the starch, but consume a part of the sugar which they form, which sugar passes into the tissues of the plant and is converted into carbonic acid and water, while if compelled to remain immersed they transform part of the sugar into alcohol and carbonic acid, the formation of fruitifications in the air being prevented. There has been, however, great interest in finding practical means for utilizing the raw material, such as grain or potatoes, for the manufacture of glucose without having first to separate the starch and then treat it by itself with acids to saccharify it.

In my improved process the grain is saccharified directly—that is, without first separating the starch. By the use of a mucedinized mass which transforms the dextrines into dextrose as rapidly as they are formed I suppress the dextrines almost entirely, and consequently produce purer glucose quite fermentable and suitable for brewing.

I have succeeded in transforming grain directly into glucose by means of saccharifying mucedins, avoiding formation of alcohol by the process which I shall now describe.

To permit the formation of fruitifications of the mucedinized mass in the air, avoiding at the same time the partial consumption of the sugar formed, so as to transform the starch without loss into dextrine and glucose, I subject the charge to aeration accompanied by continued agitation. The grain, if maize broken into large fragments and if rice decorticated, is introduced into a boiler with twice its weight of water acidulated with hydrochloric acid, amounting to 0.5 per cent. of the weight of the grain. The mixture is heated to boiling, first to 100° centigrade for one hour, then to 110° centigrade during a second hour, and finally to 120° centigrade during a third hour. The boiler may with advantage be provided with a small receptacle by which the acid can be introduced in small doses during the cooking, instead of its being all mixed at the beginning of the operation. The acid is thus more fully utilized and less of it is required. When the grain is cooked sufficiently for all its starch being transformed into dextrose, maltose, and dextrine, which may be ascertained by reaction with iodine, giving no blue particles when microscopically examined, the must, concentrated to the condition of containing about twenty-five kilos of grain in the hectoliter, is discharged into a vessel, in which complete transformation of the maltose and dextrines into dextrose is effected by the saccharifying mucedins.

The accompanying drawings show apparatus suitable for carrying out the remaining steps of the process.

Figure 2:
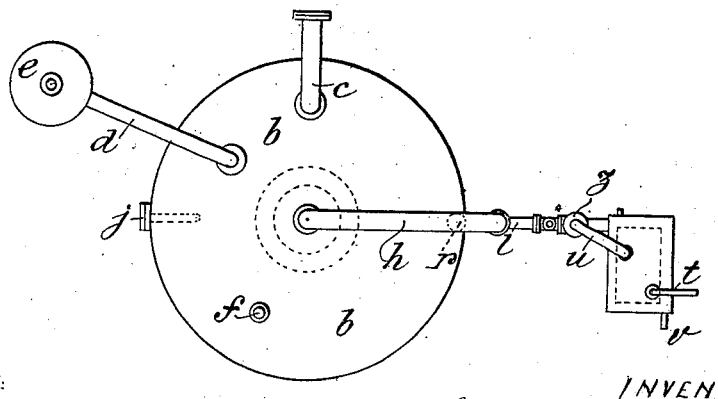
Figure 3:
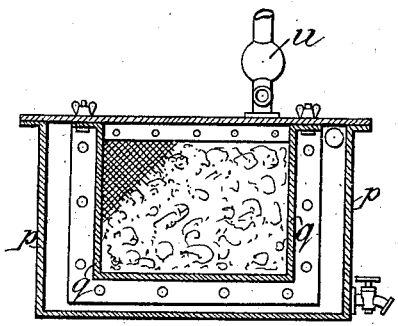
Figure 5:
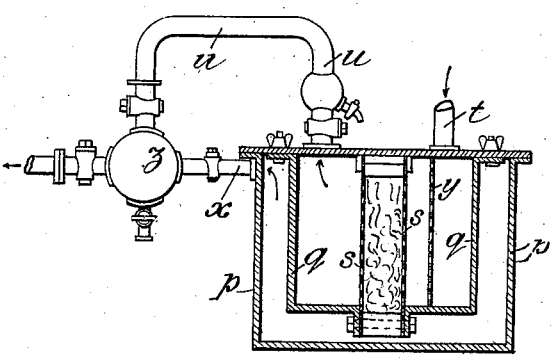
Figure 4:
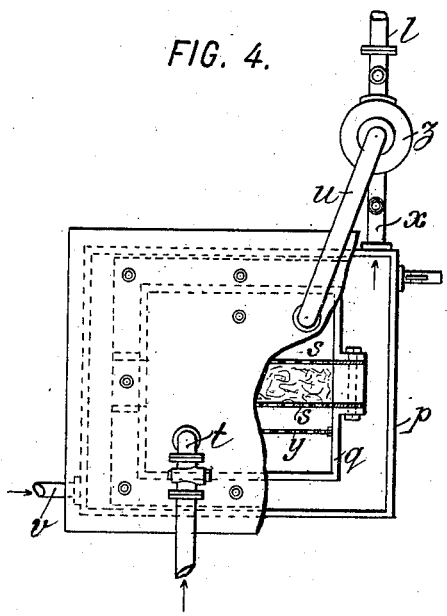

Figure 1 is a vertical section of the complete apparatus, certain parts being in elevation. Fig. 2 is a plan of the complete apparatus. Fig. 3 is a vertical section of the air-filter. Fig. 4 is a plan of the same, partly in section. Fig. 5 is a vertical section of the same on a plane at right angles to that of Fig. 3.

The vessel $a$ is closed by a cover $b$, through which there is a charging-passage $c$, an air-outlet $d$, leading to a bubbling vessel $e$, and an opening $f$ for impregnation. In the center of the vessel is arranged a tube $g$, with funnel-top open at the bottom, above which tube opens the pipe $h$, by which comes the must made into emulsion by air filtered under pressure. Around the top of the vessel is a circular tube $i$, with perforations for water to cool the exterior. On the wall of the vessel there is a thermometer-tube $j$, a cock $k$ for taking samples, and there are sight-holes glazed with thick glass. At the bottom is the discharge-pipe $m$, furnished with a valve $n$, which can be sterilized by a jet of steam introduced by $o$.

The filter employed for purifying the air employed in the process is shown on an enlarged scale in Figs. 3, 4, and 5. It consists of a chamber $p$, inclosing another, $q$, the space between these chambers being intended for passage of steam which enters by the pipe $v$ and issues by $x$. The chamber $q$ contains a transverse air-filtering partition, which consists of wadding held between two perforated partitions $s\ s$. The air enters this chamber at $t$, passes through a screen $y$ and the filter, and finally issues at $u$. The outlet-pipes $x$ for steam and $u$ for air meet in one receptacle $z$, from which branches a pipe $l$, leading to the emulsion-forming appliance $l'$ at the bottom of pipe $h$, which communicates by a short tube $l^2$ with a pipe $r$, arranged vertically in the lower end of the vessel $a$ and perforated with holes at various heights. As the tubes $h$ and $r$ communicate at bottom, the must, when at rest, stands at the same level in $h$ as in the vessel $a$. When the emulsion appliance $l$ acts, the must is raised and carried through the tube $h$ into the pipe $g$.

The operation is as follows: The vessel $a$ being in the first place charged with must prepared as above explained, the must is almost completely neutralized by introducing by $f$ sufficient sodium carbonate. The neutralizing is stopped when the acidity falls to about 0.25 per 1,000 calculated as $H_2SO_4$. Then for about twenty minutes steam is admitted to circulate in the filter around the chamber $q$ and sterilize it and the filter, as also the vessel $a$, to which it comes by the pipe $h$. The inlet $f$ is then closed in any suitable way and the supply of steam to the vessel $a$ is stopped. The cock $t$ is opened, admitting sterilized air sent by a pump, this air passing through the chamber $q$, the screen $y$, and the wadding and passing by the pipe $u$ to the receptacle $z$, the emulsion appliance $l$, and the pipe $h$. The sterilized air emulsifies the must and lifts it up through the tube $h$ to the mouth of the central pipe $g$, which the must then descends and from which it issues by openings in the bottom, spreading itself upward through the vessel and descending again by $r$ to be again emulsified in $l$, as indicated by the arrows. As the pipe $g$ has a diameter four times that of the pipe $h$, the must moves slowly, all its particles presenting themselves in turn to be aerated by the emulsifier. The air from the bubbles that burst at the surface of the must escapes by the pipe $d$ into the bubbling vessel $e$, which indicates the progress of the emulsion. The purpose of the holes in the wall of the pipe $r$ is to allow the apparatus to act whatever be the level of the liquid in $a$. Without these holes the apparatus could only work when it is full. The number of holes diminishes downward, so as to draw the liquid from the highest point, the current being strongest where the number of holes is greatest. The must after treatment with sterilized air is first aerated and cooled to a temperature of about 38° centigrade. The cooling and aeration take place together, the emulsifying appliance being put in operation and the outside being cooled by watering at the same time. The contents of the vessel are then impregnated by introducing by the tube $f$ a bulb containing a pure culture of saccharifying mucedin in the state of young mycelium without spores. Several species of mucedins, mucor, or aspergillus can be employed. The most suitable are those belonging to the aspergillus group. In order to save time in working with large quantities of must, it may be of advantage to make a mucedin yeast or leaven in a small apparatus annexed to the vessel $a$ and having similar arrangements. The emulsion continuing and the temperature being maintained between 35° and 38° centigrade, it is found that at the end of twenty-four hours the transformation of the maltose and dextrine of the must into dextrose is almost complete. To prevent alcoholic fermentation of the glucose by the portion affected by mucedins, the vessel must then be immediately cooled by watering its outside, so as to bring the temperature of the must to 10° or 15° centigrade. At this temperature there is no further development of the portion affected by mucedins, but there escape from its cellules a large quantity of dextrinase and maltase, which complete the transformation of the starch derivatives into glucose. The same result may be attained by heating the must to 55° centigrade instead of cooling it. The part affected by mucedins then ceases to develop, but lets escape from it much diastase into the surrounding liquid; but there is no economical advantage in reheating the must. It is better to cool it, as above described. If during the first twenty-four hours the temperature of the must went down below 35° centigrade, the development of the mycelium of the mucedin would not take place. It would therefore be necessary to reheat the sterilized emulsifying-air, which could be done by introducing steam into the outer space of the filter, the thermometer indicating exactly the temperature of the air issuing from the filter. Under these conditions the multiplication of the mycelium can be promoted without diluting the must or burning the cellules of the ferment by direct contact with steam. When the transformation into glucose is complete, which takes about thirty-six hours without use of leavens or twenty-four hours with their use, the material is again neutralized by addition of sodium carbonate until the must is very feebly acid and the saccharified must is filter-pressed. The press retains the unattacked coverings of the grain and all the insoluble ingredients of the must with the mucedin mycelium. The residues thus obtained, like those from a distillery, form excellent food for animals. After filtration syrups of various densities or crystallized glucose can be obtained, as may be required, for manufacturing purposes.

Wooden vessels at present in use in glucose manufactories might be utilized if they were covered by a removable metal cover and provided at the side or within the vessel with emulsifying apparatus and with an air-filter like that described. Malt might also be employed for preliminary saccharification if the trade conditions permitted, as the mucedin would transform the maltose and dextrines into dextrose and would aid in obtaining in all cases glucose more pure and almost entirely clear of dextrines.

Having thus described the nature of this invention and the best means I know for carrying the same into practical effect, I claim—

In the manufacture of glucose by treating derivatives of starch with saccharifying mucedins, the process of preventing alcoholic fermentation which consists in cooling the mucedinized mass to approximately 10° or 15° centigrade, whereby its development is hindered.

In witness whereof I have hereunto signed my name in the presence of two subscribing witnesses.

LÉON CHARLES ALBERT CALMETTE.

Witnesses:
   JULES ARMENGAUD, Jr.,
   EDWARD P. MACLEAN.